G. L. ELLIS.
Peg-Cutter for Boots and Shoes.

No. 165,411. Patented July 13, 1875.

WITNESSES.
Frank Pardon
W. W. Dawson

INVENTOR.
George L. Ellis
by J. G. Hewitt
attorney

UNITED STATES PATENT OFFICE.

GEORGE L. ELLIS, OF NEW ALBANY, INDIANA, ASSIGNOR OF ONE-HALF HIS RIGHT TO W. T. ELLIS, OF LOUISVILLE, KENTUCKY.

IMPROVEMENT IN PEG-CUTTERS FOR BOOTS AND SHOES.

Specification forming part of Letters Patent No. 165,411, dated July 13, 1875; application filed May 14, 1875.

*To all whom it may concern:*

Be it known that I, GEORGE L. ELLIS, of the city of New Albany, in the county of Floyd and State of Indiana, have invented a certain new and useful Device or Tool for Cutting the Pegs from the Interior of Boots and Shoes; and I do hereby declare that the following is a full, clear, and exact description thereof, which will enable others skilled in the art to make and use the same, reference being had to the accompanying drawings forming part of this specification.

Figure 1:
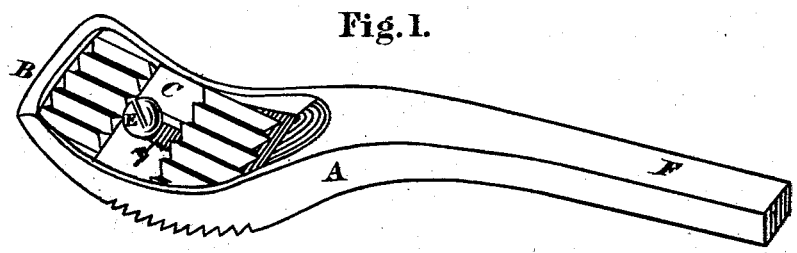
Figure 2:
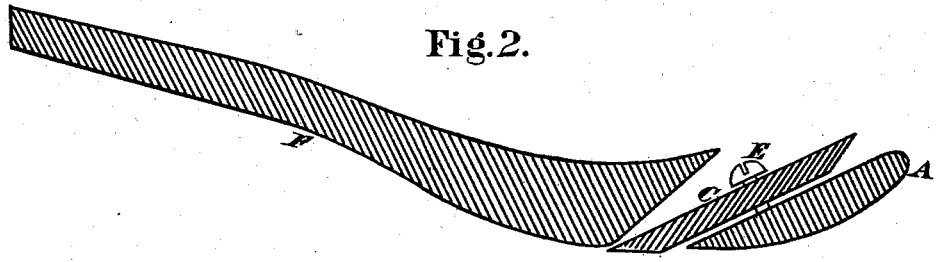

Figure 1 is a perspective view of the device, showing the corrugated or toothed cutter. Fig. 2 is a sectional view, showing the cutter when arranged to cut in the direction of the handle.

Similar letters of reference indicate corresponding parts.

This invention relates to the adjustable corrugated chisel or toothed cutter, having a slot-hole in the center, so that when a set-screw is passed through it into a threaded hole in the frame part of the device the cutter or chisel can be lowered or raised in order to cut the peg all at once, or as moderately as the operator may desire, without danger of injuring the shoe. This cutter or chisel is provided with teeth or cutting-edges at both ends, so arranged that when set in the frame they will cut the pegs off smooth and level with the sole, but cannot cut the leather, as in the case of those now in use, and is so arranged as to expedite its removal for repairs or sharpening by means of the set-screw through the center, but may be fastened by a wedge or otherwise, and may be set in the frame so as to cut in any direction. The frame is also provided with a guard across the front, to prevent the cutter from injuring the sides or front of the shoe in its operation. The object in corrugating the top part of the cutter is to form teeth, by means of the bevel on the under side, that will cut the pegs down on a level with the sole, but cannot cut lower, from the fact that the heel of the cutter is made to rest slightly on the sole, and therefore can only cut objects in front of the teeth, but at the same time the sole will be further smoothed by the corrugations or teeth on the under side of the frame. It is not intended that the cutters should be arranged in the same frame to cut both ways, but may be so used, if necessary.

The device or tool is more fully illustrated in perspective view, Fig. 1, and sectional view, Fig. 2, in which A is the head or frame, all of which is made of metal and corrugated or toothed on the under side, similar to a file, as shown in the drawing. B is the guard in front, to prevent cutting the shoe. C is the corrugated cutter or chisel, all of which is made of steel, and in form as shown in the drawing. D is the slot for the set-screw, by which it is held in position. E is the set-screw for adjusting the cutters, which may be so arranged in the frame or in separate frames as to cut in either direction. F is the handle of the frame, &c.

Having thus fully described the nature and object of this my invention, what I claim as new, and desire to secure by Letters Patent, is—

In an apparatus for cutting pegs from boots and shoes, the frame A, having a serrated under surface and an end guard, B, in combination with the adjustable corrugated cutter C, provided with the slot D and set-screw E, substantially as shown and described.

GEORGE L. ELLIS.

Witnesses:
FRANK PARDON,
W. W. DAWSON.